United States Patent [19]

Barancyk et al.

[11] Patent Number: 5,663,244

[45] Date of Patent: Sep. 2, 1997

[54] FLEXIBLE AMINOPLAST-CURABLE FILM-FORMING COMPOSITIONS PROVIDING FILMS HAVING RESISTANCE TO ACID ETCHING

[75] Inventors: Steven V. Barancyk; Christopher A. Verardi; William A. Humphrey, all of Pittsburgh, Pa.

[73] Assignee: PPG Industries, Inc., Pittsburgh, Pa.

[21] Appl. No.: 447,392

[22] Filed: May 23, 1995

Related U.S. Application Data

[62] Division of Ser. No. 236,912, Apr. 29, 1994, abandoned.

[51] Int. Cl.$^6$ .............. C08L 61/28; C08L 75/04; C08L 75/08
[52] U.S. Cl. ............... 525/456; 427/407.1; 427/412.1; 427/412.3; 427/384; 427/385.5; 428/413; 428/423.1; 428/480; 428/522; 428/524; 525/457; 525/451; 525/509
[58] Field of Search ................ 525/456, 457, 525/451, 509; 427/407.1, 412.3, 412.1, 384, 385.5; 428/413, 423.1, 480, 524, 522

[56] References Cited

U.S. PATENT DOCUMENTS

| | | | |
|---|---|---|---|
| 3,464,938 | 9/1969 | Nordstrom | 260/21 |
| 4,110,286 | 8/1978 | Vandegaer et al. | 260/29.2 TN |
| 4,154,891 | 5/1979 | Porter, Jr. et al. | 428/334 |
| 4,279,833 | 7/1981 | Culbertson et al. | 260/464 |
| 4,308,184 | 12/1981 | Thoma et al. | 260/29.2 TN |
| 4,477,618 | 10/1984 | Singer et al. | 524/157 |
| 4,520,167 | 5/1985 | Blank et al. | 525/131 |
| 4,543,276 | 9/1985 | Parekh | 427/388.3 |
| 4,677,168 | 6/1987 | Hoy et al. | 525/441 |
| 4,913,972 | 4/1990 | Grunewalder et al. | 428/425.5 |
| 5,300,328 | 4/1994 | Rehfuss | 427/388.3 |
| 5,356,669 | 10/1994 | Rehfuss et al. | 427/407.1 |
| 5,373,069 | 12/1994 | Rehfuss et al. | 525/456 |
| 5,451,656 | 9/1995 | Menovcik et al. | 528/288 |
| 5,474,811 | 12/1995 | Rehfuss et al. | 427/407.1 |
| 5,475,064 | 12/1995 | Menovcik et al. | 525/441 |
| 5,508,379 | 4/1996 | Menovcik et al. | 528/367 |
| 5,512,639 | 4/1996 | Rehfuss et al. | 525/456 |
| 5,532,061 | 7/1996 | Menovcik et al. | 428/423.1 |
| 5,552,497 | 9/1996 | Taylor et al. | 525/456 |

FOREIGN PATENT DOCUMENTS

| | | |
|---|---|---|
| 0 211 359 | 2/1987 | European Pat. Off. . |
| 0 257 848 | 3/1988 | European Pat. Off. . |
| 0 594 068 | 4/1994 | European Pat. Off. . |
| 0 594 142 | 4/1994 | European Pat. Off. . |
| 51-4124 | 1/1976 | Japan . |
| WO87/00851 | 2/1987 | WIPO . |
| WO94/10211 | 5/1994 | WIPO . |
| WO94/10212 | 5/1994 | WIPO . |
| WO94/10213 | 5/1994 | WIPO . |

*Primary Examiner*—W. Robinson H. Clark
*Attorney, Agent, or Firm*—Kenneth J. Stachel

[57] ABSTRACT

A flexible, aminoplast-curable film-forming composition and a process for preparing multi-layered coated articles coated with a pigmented or colored base coat and a transparent or clear topcoat are disclosed. A pigmented or colored base coat is first applied to a substrate followed by the application of a transparent topcoat to the base coat. The transparent topcoat composition is a flexible, curable film-forming composition comprising (1) a polyether polymer containing a plurality of terminal or pendant carbamate groups of the structure:

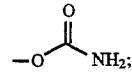

and (2) an aminoplast crosslinking agent. The topcoat composition provides a flexible composite coating with improved acid etch resistance, making the composite coating particularly useful as a topcoat for plastic automotive parts.

15 Claims, No Drawings

FLEXIBLE AMINOPLAST-CURABLE FILM-FORMING COMPOSITIONS PROVIDING FILMS HAVING RESISTANCE TO ACID ETCHING

CROSS REFERENCE TO RELATED APPLICATIONS

This is a divisional of U.S. patent application Ser. No. 08/236,912, filed Apr. 29, 1994, now abandoned, which is related to U.S. patent application Ser. No. 07/968,786, now abandoned; Ser. No. 07/968,795 now abandoned; and Ser. No. 07/968,807, all filed on Oct. 30, 1992, now abandoned.

FIELD OF THE INVENTION

The present invention relates to flexible, aminoplast-curable film-forming compositions, and a process for preparing multi-layered coated articles comprising a pigmented or colored base coat and a transparent or clear topcoat.

BACKGROUND OF THE INVENTION

Plastic substrates are commonly used in automotive parts and accessories. Organic coating compositions are very often applied to these substrates for decorative and protective purposes. These plastic substrates are made of a variety of flexible thermosetting and thermoplastic materials such as polyethylene and polypropylene, thermoplastic urethane, polycarbonate, thermosetting sheet molding compound, reaction-injection molding compound, acrylonitrile-based materials, nylon, and the like. The coating compositions that are used on these substrates must also be flexible so as to avoid cracking and adhesive failure under normal stresses and torsional forces to which the substrates may be subjected.

Color-plus-clear coating systems involving the application of a colored or pigmented base coat to a substrate followed by the application of a transparent or clear topcoat to the base coat have become conventional as original finishes for automobiles. The color-plus-clear systems have outstanding gloss and distinctness of image, and the clear coat is particularly important for these properties.

Aminoplast-cured coating systems are also well known and provide many excellent coating properties. They are inexpensive, durable, and attractive. However, it is widely recognized that such coatings, particularly clear coats, have poor resistance to etching by acid. Because many geographic areas encounter acidic precipitation, acid etch resistance in coatings is becoming an increasingly desirable property, particularly for automotive coatings. Coating systems of the prior art are not highly effective for providing protection against etching caused by acid rain.

Coating systems of the prior art which are known to be resistant to acid etch include acid-epoxy curable compositions such as those disclosed in U.S. Pat. No. 4,681,811 and compositions containing hydroxyl functional polymers reacted with isocyanates or polyisocyanates to form polyurethanes. The isocyanates are expensive and the toxicity of the isocyanates is an additional drawback.

It is desirable to provide an inexpensive, flexible coating composition for use on flexible automotive substrates using aminoplast curing agents which can be used in a color-plus-clear composite coating system having improved acid etch resistance properties.

SUMMARY OF THE INVENTION

In accordance with the present invention, a flexible, curable film-forming composition is provided comprising (i) a polyether polymer containing a plurality, preferably an average of at least two, of terminal or pendant carbamate groups of the structure:

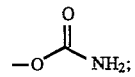

and (ii) an aminoplast crosslinking agent containing methylol and/or methylol ether groups. In a preferred embodiment of the present invention, the film-forming composition further includes a polyester or polyurethane polymer and an acrylic polymer, each having a plurality of terminal or pendant carbamate groups like those described above.

A process for applying a composite coating to a substrate, preferably a plastic substrate, is also provided. The process comprises applying to the substrate a film-forming composition to form a base coat and applying to the base coat a clear film-forming composition to form a transparent topcoat over the base coat. The transparent topcoat; or clear coat, is derived from a flexible, curable film-forming composition comprising (i) a polyether polymer containing a plurality of terminal or pendant carbamate groups of the structure:

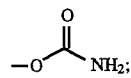

and (ii) an aminoplast crosslinking agent containing methylol and/or methylol ether groups.

DETAILED DESCRIPTION

The polyether polymer mentioned above may be prepared by reacting a polyether polyol with urea. More typically the polyether polymer is prepared by a transcarbamoylation reaction described more fully below.

Examples of polyether polyols are polyalkylene ether polyols which include those having the following structural formula:

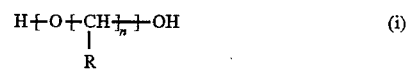 (i)

or

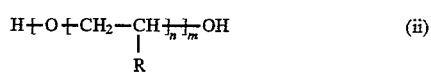 (ii)

where the substituent R is hydrogen or lower alkyl containing from 1 to 5 carbon atoms including mixed substituents, and n is typically from 2 to 6 and m is from 8 to 100 or higher. Included are poly(oxytetramethylene) glycols, poly(oxytetraethylene) glycols, poly(oxy-1,2-propylene) glycols, and poly(oxy-1,2-butylene) glycols.

Also useful are polyether polyols formed from oxyalkylation of various polyols, for example, glycols such as ethylene glycol, 1,6-hexanediol, Bisphenol A and the like, or other higher polyols such as trimethylolpropane, pentaerythritol, and the like. Polyols of higher functionality which can be utilized as indicated can be made, for instance, by oxyalkylation of compounds such as sucrose or sorbitol. One commonly utilized oxyalkylation method is reaction of a polyol with an alkylene oxide, for example, propylene or ethylene oxide, in the presence of an acidic or basic catalyst.

Preferred polyethers include those sold under the names TERATHANE and TERACOL, available from E. I. Du Pont de Nemours and Company, Inc.

Preferably, pendant carbamate functional groups may be incorporated into the polyethers by a "transcarbamoylation" reaction. In this reaction, a low molecular weight carbamate functional material derived from an alcohol or glycol ether is reacted with the hydroxyl groups of the polyether polyol, yielding a carbamate functional polyether and the original alcohol or glycol ether. The low molecular weight carbamate functional material derived from an alcohol or glycol ether is first prepared by reacting the alcohol or glycol ether with urea in the presence of a catalyst. Suitable alcohols include lower molecular weight aliphatic, cycloaliphatic, and aromatic alcohols such as methanol, ethanol, propanol, butanol, cyclohexanol, 2-ethylhexanol, and 3-methylbutanol. Suitable glycol ethers include ethylene glycol methyl ether and propylene glycol methyl ether. Propylene glycol methyl ether is preferred.

The polyether polymer preferably has a number average molecular weight of from about 500 to 5000, more preferably from about 1100 to 3200 as determined by gel permeation chromatography using a polystyrene standard, and an equivalent weight of within the range of 140 to 2500, preferably about 500, based on equivalents of reactive pendant or terminal carbamate groups. The equivalent weight is a calculated value based on the relative amounts of the various ingredients used in making the polyether polymer and is based on solids of the polyether polymer. Preferably the pendant or terminal carbamate groups only have the structure depicted above.

The polyether polymer is typically present in the film-forming composition in amounts of 10 to 50, preferably 10 to 20 percent by weight based on weight of resin solids in the film-forming composition.

Preferably the film-forming composition further comprises a polymer selected from the group consisting of a polyester polymer, a polyurethane polymer, an acrylic polymer, and mixtures thereof wherein each polymer contains a plurality of terminal or pendant carbamate groups of the structure:

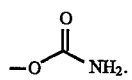

This polymer or mixture of polymers (not including the polyether polymer) is used in amounts up to 60, preferably 5 to 50 percent by weight based on resin solids in the film-forming composition, depending on the particular polymer or mixture of polymers used.

The acrylic polymers are copolymers of one or more alkyl esters of acrylic acid or methacrylic acid, and, optionally, one or more other polymerizable ethylenically unsaturated monomers. Suitable alkyl esters of acrylic or methacrylic acid include methyl methacrylate, ethyl methacrylate, butyl methacrylate, ethyl acrylate, butyl acrylate, and 2-ethylhexyl acrylate. Suitable other polymerizable ethylenically unsaturated monomers include vinyl aromatic compounds such as styrene and vinyl toluene; nitriles such as acrylonitrile and methacrylonitrile; vinyl and vinylidene halides such as vinyl chloride and vinylidene fluoride and vinyl esters such as vinyl acetate. The acrylic polymers may contain hydroxyl functionality which can be incorporated into the acrylic polymer through the use of hydroxyl functional monomers such as hydroxyethyl acrylate, hydroxypropyl acrylate, hydroxyethyl methacrylate, and hydroxypropyl methacrylate which may be copolymerized with the other acrylic monomers.

The acrylic polymer may be prepared by solution polymerization techniques in the presence of suitable initiators such as organic peroxides or azo compounds, for example, benzoyl peroxide or N,N-azobis(isobutyronitrile). The polymerization may be carried out in an organic solution in which the monomers are soluble by techniques conventional in the art.

Pendant carbamate functional groups may be incorporated into the acrylic polymer by copolymerizing the acrylic monomers with a carbamate functional vinyl monomer, for example a carbamate functional alkyl ester of methacrylic acid. These carbamate functional alkyl esters are prepared by reacting, for example, a hydroxyalkyl carbamate, such as the reaction product of ammonia and ethylene carbonate or propylene carbonate, with methacrylic anhydride. Other carbamate functional vinyl monomers are, for instance, the reaction product of hydroxyethyl methacrylate, isophorone diisocyanate, and hydroxypropyl carbamate. Still other carbamate functional vinyl monomers may be used, such as the reaction product of isocyanic acid (HNCO) with a hydroxyl functional acrylic or methacrylic monomer such as hydroxyethyl acrylate, and those described in U.S. Pat. No. 3,479,328. pendant carbamate groups can also be incorporated into the acrylic polymer by reacting a hydroxyl functional acrylic polymer with a low molecular weight carbamate functional material via a transcarbamoylation process similar to the one described above in connection with the incorporation of carbamate groups into the polyethers.

The acrylic polymer typically has a number average molecular weight of from about 900 to 13,000, preferably from about 1000 to 5000 as determined by gel permeation chromatography using a polystyrene standard, and a carbamate equivalent weight less than 5000, preferably within the range of 140 to 2500, based on equivalents of reactive pendant or terminal carbamate groups. The equivalent weight is a calculated value based on the relative amounts of the various ingredients used in making the acrylic material and is based on solids of the acrylic polymer.

The acrylic polymer, when present in the film-forming composition, is used in amounts up to 50, preferably 5 to 15 percent by weight based on weight of resin solids in the film-forming composition.

Polyesters may also be used in the formulation of the film-forming composition and may be prepared by the polyesterification of a polycarboxylic acid or anhydride thereof with polyols and/or an epoxide. Usually, the polycarboxylic acids and polyols are aliphatic or aromatic dibasic acids and diols.

The polyols which are usually employed in making the polyester include alkylene glycols, such as ethylene glycol, neopentyl glycol and other glycols, such as hydrogenated Bisphenol A, cyclohexanediol, cyclohexanedimethanol, caprolactonediol, for example, the reaction product of epsilon-caprolactone and ethylene glycol, hydroxyalkylated bisphenols, polyether glycols, for example, poly(oxytetramethylene) glycol and the like. Polyols of higher functionality may also be used. Examples include trimethylolpropane, trimethylolethane, pentaerythritol and the like.

The acid component of the polyester consists primarily of monomeric carboxylic acids or anhydrides thereof having 2 to 18 carbon atoms per molecule. Among the acids which are useful are phthalic acid, isophthalic acid, terephthalic acid, tetrahydrophthalic acid, hexahydrophthalic acid, adipic acid, azelaic acid, sebacic acid, maleic acid, glutaric acid, decanoic diacid, dodecanoic diacid and other dicarboxylic acids of various types. The polyester may include minor amounts of monobasic acids such as benzoic acid, stearic acid, acetic acid, and oleic acid. Also, there may be employed higher carboxylic acids such as trimellitic acid and tricarballylic acid. Where acids are referred to above, it is understood that anhydrides thereof which exist may be used in place of the acid. Also, lower alkyl esters of the acids such as dimethyl glutarate and dimethyl terephthalate may be used.

Pendant carbamate functional groups may be incorporated into the polyester by first forming a hydroxyalkyl carbamate which can be reacted with the polyacids and polyols used in forming the polyester. An example of a hydroxyalkyl carbamate is the reaction product of ammonia and ethylene carbonate or propylene carbonate. The hydroxyalkyl carbamate is condensed with acid functionality on the polyester, yielding pendant carbamate functionality. Pendant carbamate functional groups may also be incorporated into the polyester by reacting a hydroxyl functional polyester with a low molecular weight carbamate functional material via a transcarbamoylation process similar to the one described above in connection with the incorporation of carbamate groups into the polyethers, or by reacting isocyanic acid with a hydroxyl functional polyester.

The polyester typically has a number average molecular weight of from about 600 to 2000, preferably from about 800 to 1500 as determined by gel permeation chromatography using a polystyrene standard, and a carbamate equivalent weight within the range of 200 to 1500, preferably about 300 to 400, based on equivalents of reactive pendant or terminal carbamate groups. The equivalent weight is a calculated value based on the relative amounts of the various ingredients used in making the polyester and is based on solids of the polyester.

The polyester polymer, when present in the film-forming composition, is used in amounts up to 60, preferably 20 to 50 percent by weight based on weight of resin solids in the film-forming composition.

Polyurethanes can also be used in the film-forming composition of the present invention. Among the polyurethanes which can be used are polymeric polyols which are prepared by reacting the polyester polyols or acrylic polyols such as those mentioned above with a polyisocyanate such that the OH/NCO equivalent ratio is greater than 1:1 so that free hydroxyl groups are present in the product.

The organic polyisocyanate which is used to prepare the polyurethane polyol can be an aliphatic or an aromatic polyisocyanate or a mixture of the two. Diisocyanates are preferred, although higher polyisocyanates can be used in place of or in combination With diisocyanates.

Examples of suitable aromatic diisocyanates are 4,4'-diphenylmethane diisocyanate and toluene diisocyanate. Examples of suitable aliphatic diisocyanates are straight chain aliphatic diisocyanates such as 1,6-hexamethylene diisocyanate. Also, cycloaliphatic diisocyanates can be employed. Examples include isophorone diisocyanate and 4,4'-methylene-bis-(cyclohexyl isocyanate). Examples of suitable higher polyisocyanates are 1,2,4-benzene triisocyanate and polymethylene polyphenyl isocyanate.

Pendant carbamate functional groups may be incorporated into the polyurethane by reacting a polyisocyanate with a polyester polyol containing the pendant carbamate groups. Alternatively, the pendant carbamate functional groups may be incorporated into the polyurethane by reacting a polyisocyanate with a polyester polyol and a hydroxyalkyl carbamate or isocyanic acid as separate reactants. Pendant carbamate functional groups may also be incorporated into the polyurethane by reacting a hydroxyl functional polyurethane with a low molecular weight carbamate functional material via a transcarbamoylation process similar to the one described above in connection with the incorporation of carbamate groups into the polyethers.

The polyurethane typically has a number average molecular weight of from about 300 to 3000, preferably from about 300 to 600 as determined by gel permeation chromatography using a polystyrene standard, and a carbamate equivalent weight within the range of 140 to 2600, based on equivalents of reactive pendant or terminal carbamate groups. The equivalent weight is a calculated value based on the relative amounts of the various ingredients used in making the polyurethane and is based on solids of the polyurethane.

The polyurethane polymer, when present in the film-forming composition, is used in amounts up to 50, preferably up to 20 percent by weight based on weight of resin solids in the film-forming composition.

The coating composition also includes an aminoplast crosslinking agent containing methylol and/or methylol ether groups. Aminoplasts are obtained from the reaction of formaldehyde with an amine or amide. The most common amines or amides are melamine, urea, or benzoguanamine, and are preferred. However, condensates with other amines or amides can be used; for example, aldehyde condensates of glycoluril, which give a high melting crystalline product which is useful in powder coatings. While the aldehyde used is most often formaldehyde, other aldehydes such as acetaldehyde, crotonaldehyde, and benzaldehyde may be used.

The aminoplast contains methylol groups and preferably at least a portion of these groups are etherified with an alcohol to modify the cure response. Any monohydric alcohol may be employed for this purpose including methanol, ethanol, butanol, and hexanol.

Preferably, the aminoplasts which are used are melamine-, urea-, or benzoguanamine-formaldehyde condensates etherified with an alcohol containing from one to four carbon atoms. The aminoplast is present in amounts of about 20 to 50, preferably 20 to 35 percent by weight based on weight of resin solids in the film-forming composition.

In the coating composition of the present invention, preferably the equivalent ratio of the pendant or terminal carbamate groups in the polymers to methylol or methylol ether groups in the aminoplast is from 0.5 to 2:1 and is sufficient to form a crosslinked film.

Preferably, prior to crosslinking, the film-forming composition comprising the polymer(s) having the pendant or terminal carbamate groups and the aminoplast has a theoretical hydroxyl value less than 50, preferably less than 25, and more preferably 0, based on solid weight of the film-forming composition, excluding any hydroxyl functionality associated with N-methylol groups such as those in an aminoplast.

By theoretical hydroxyl value is meant the calculated value based on the relative amounts of the various ingredients used in making the film-forming composition, rather than the actual hydroxyl value which is measured on the film-forming composition itself by conventional analytical techniques. The resultant crosslinked coating contains a substantial number of urethane crosslinks which arise from reaction of the terminal or pendant carbamate groups with the aminoplast, thereby providing a high level of acid etch resistance.

The film-forming composition of the present invention is preferably used as the clear coat layer in a "color-plus-clear" coating system. The film-forming composition of the base coat in the color-plus-clear system can be any of the compositions useful in coatings applications, particularly automotive applications. The film-forming composition of the base coat comprises a resinous binder and a pigment to act as the colorant. Particularly useful resinous binders are acrylic polymers, polyesters, including alkyds, and polyurethanes.

The base coat compositions may be solventborne or waterborne. Water-based base coats in color-plus-clear compositions are disclosed in U.S. Pat. No. 4,403,003, and the resinous compositions used in preparing these base coats can be used in the practice of this invention. Also, water-based polyurethanes such as those prepared in accordance with U.S. Pat. No. 4,147,679 can be used as the resinous binder in the base coat. Further, waterbased coatings such as those described in U.S. Pat. No. 5,071,904 can be used as the base coat.

The base coat also contains pigments to give it color. Compositions containing metallic flake pigmentation are useful for the production of so-called "glamour metallic" finishes chiefly upon the surface of automobile bodies. Suitable metallic pigments include in particular aluminum flake, copper bronze flake and metal oxide coated mica.

Besides the metallic pigments, the base coating compositions of the present invention may contain non-metallic color pigments conventionally used in surface coatings including inorganic pigments such as titanium dioxide, iron oxide, chromium oxide, lead chromate, and carbon black, and organic pigments such as phthalocyanine blue and phthalocyanine green. In general, the pigment is incorporated into the coating composition in amounts of about 1 to 80 percent by weight based on weight of coating solids. The metallic pigment is employed in amounts of about 0.5 to 25 percent by weight based on weight of coating solids.

If desired, the base coat composition may contain additional materials well known in the art of formulated surface coatings. These would include surfactants; flow control agents, thixotropic agents, fillers, anti-gassing agents, organic cosolvents, catalysts, and other customary auxiliaries. These materials can constitute up to 40 percent by weight of the total weight of the coating composition.

The base coating compositions can be applied to various substrates to which they adhere. The compositions can be applied by conventional means including brushing, dipping, flow coating, spraying and the like, but they are most often applied by spraying. The usual spray techniques and equipment for air spraying and electrostatic spraying and either manual or automatic methods can be used.

Although the coatings of the present invention may be applied to various substrates including wood, metals, and glass, they are particularly effective in applications over plastic substrates that are found on motor vehicles. By "plastic" is meant any of the common thermoplastic or thermosetting synthetic nonconductive materials, including thermoplastic olefins such as polyethylene and polypropylene, thermoplastic urethane, polycarbonate, thermosetting sheet molding compound, reaction-injection molding compound, acrylonitrile-based materials, nylon, and the like.

During application of the base coat composition to the substrate, a film of the base coat is formed on the substrate. Typically, the base coat thickness will be about 0.01 to 5, preferably 0.1 to 2 mils in thickness.

After application of the base coat to the substrate, a film is formed on the surface of the substrate by driving solvent, i.e., organic solvent or water, out of the base coat film by heating or by an air drying period. Preferably, the heating will only be for a short period of time, sufficient to ensure that the clear coat can be applied to the base coat without the former dissolving the base coat composition. Suitable drying conditions will depend on the particular base coat composition, and on the ambient humidity with certain waterbased compositions, but in general a drying time of from about 1 to 5 minutes at a temperature of about 80°–250° F. (20°–121° C.) will be adequate to ensure that mixing of the two coats is minimized. At the same time, the base coat film is adequately wetted by the clear coat composition so that satisfactory intercoat adhesion is obtained. Also, more than one base coat and multiple clear coats may be applied to develop the optimum appearance. Usually between coats, the previously applied coat is flashed; that is, exposed to ambient conditions for about 1 to 20 minutes.

As mentioned above, the clear film-forming composition will contain the carbamate functional polyether polymers and preferably a carbamate functional polymer selected from the group consisting of a polyester polymer, a polyurethane polymer, an acrylic polymer, and mixtures thereof as well as an aminoplast crosslinking agent. Usually the clear film-forming composition will also preferably contain catalysts to accelerate the cure of the aminoplast and pendant carbamate groups. Examples of suitable catalysts are acidic materials and include sulfonic acid or a substituted sulfonic acid such as paratoluene sulfonic acid. The catalyst is usually present in an amount of about 0.5 to 5.0 percent by weight, preferably about 1 to 2 percent by weight, based on weight of total resin solids. Optional ingredients such as, for example, plasticizers, flow controllers, anti-oxidants, UV light absorbers and similar additives conventional in the art may be included in the composition. These ingredients are typically present at up to 25% by weight based on total resin solids.

The clear topcoat composition may be applied to the base coated substrate by any conventional coating technique such as brushing, spraying, dipping or flowing, but spray applications are preferred because of superior gloss. Any of the known spraying techniques may be employed such as compressed air spraying, electrostatic spraying and either manual or automatic methods.

After application of the clear coat composition to the base coat, the coated substrate is heated to cure the coating layers. In the curing operation, solvents are driven off and the film-forming materials of the clear coat and the base coat are each crosslinked. The heating or curing operation is usually carried out at a temperature in the range of from 160°–350° F. (71°–177° C.) but if needed, lower or higher temperatures may be used as necessary to activate crosslinking mechanisms. The thickness of the clear coat is usually from about preferably 1.2–3 mils.

The invention will further be described by reference to the following examples. Unless otherwise indicated, all parts are by weight.

EXAMPLE A

A carbamate functional polyether was prepared from the following ingredients:

| Ingredient | Weight in grams |
| --- | --- |
| TERATHANE '650[1] | 1300.00 |
| Propylene glycol methyl ether (DOWANOL PM) carbamate[2] | 526.3 |
| butyl stannoic acid (BSA) | 1.83 |
| triphenylphosphite (TPP) | 1.83 |

[1]Polytetramethylene glycol, available from E. I. Du Pont de Nemours and Company, Inc., having a number average molecular weight of 600 to 700 and an OH value of 160 to 187
[2]Reaction product of Propylene glycol methyl ether (available from Dow Chemical Co. as DOWANOL PM) and urea, 96.0% in DOWANOL PM A suitable reactor equipped for vacuum distillation was charged with the above ingredients and heated to 100° C. under a $N_2$ blanket. The reaction mixture was sparged with $N_2$ for 20 minutes at this temperature. Upon completion of sparging the temperature of the reaction mixture was raised to 140° C. Vacuum was applied to the system until DOWANOL PM began to distill from the reaction mixture. The vacuum on the system was gradually increased as the reaction progressed to a maximum vacuum of 1 mm to maintain a steady distillation of DOWANOL PM. The resultant reaction mixture was a soft, white, waxy opaque material with a OH value of 12.9, a total N content of 3.67%, and a number average molecular weight of 1192 as determined by gel permeation chromatography using a polystyrene standard. The calculated carbamate equivalent weight was 386.

EXAMPLE B

A carbamate functional polyether was prepared from the following ingredients:

| Ingredient | Weight in grams |
| --- | --- |
| POLYMEG 1000[1] | 2000.00 |
| DOWANOL PM carbamate | 524.4 |
| butyl stannoic acid | 2.51 |
| triphenylphosphite | 2.51 |

[1]Polytetramethylene glycol, having a number average molecular weight of about 1000, available from Q O Chemicals, Inc., a subsidiary of Great Lakes Chemical Corp.

A suitable reactor equipped for vacuum distillation was charged with the above ingredients and heated to 100° C. The reaction mixture was sparged with $N_2$ for 20 minutes at this temperature.

Upon completion of sparging the temperature of the reaction mixture was raised to 140° C. Vacuum was applied to the system until DOWANOL PM began to distill from the reaction mixture. The vacuum on the system was gradually increased as the reaction progressed to a maximum vacuum of 1 mm in order to maintain a steady distillation of DOWANOL PM. The resultant reaction mixture was a soft, white, waxy opaque material with a OH value of 15.4, a total N content of 3.67%, and a number average molecular weight of 1748 as determined by gel permeation chromatography using a polystyrene standard. The calculated carbamate equivalent weight was 571.

EXAMPLE C

A carbamate functional polyether was prepared from the following ingredients:

| Ingredient | Weight in grams |
| --- | --- |
| TERATHANE 2000[1] | 2000.00 |
| DOWANOL PM carbamate | 263.15 |
| butyl stannoic acid | 2.27 |
| triphenylphosphite | 2.27 |

[1]Polytetramethylene glycol, available from E. I. Du Pont de Nemours and Company, Inc., having a number average molecular weight of 1900 to 2100 and an OH value of 53 to 59

A suitable reactor equipped for vacuum distillation was charged with the above ingredients and heated to 100° C. The reaction mixture was sparged with $N_2$ for 20 minutes at this temperature. Upon completion of sparging the temperature of the reaction mixture was raised to 140° C. Vacuum was applied to the system until DOWANOL PM began to distill from the reaction mixture. The vacuum on the system was gradually increased as the reaction progressed to a maximum vacuum of 1 mm to maintain a steady distillation of DOWANOL PM. The resultant reaction mixture was a soft, slightly yellow, waxy opaque material with a OH value of 5.4, a total N content of 1.3%, and a number average molecular weight of 3127 as determined by gel permeation chromatography using a polystyrene standard. The calculated carbamate equivalent weight was 1095.

EXAMPLE D

A carbamate functional linear polyester urethane was prepared from the following ingredients:

| Ingredient | Weight in grams |
| --- | --- |
| polyester urethane polyol[1] | 2348.4 |
| triphenylphosphite | 2.35 |
| DOWANOL PM carbamate | 744.66 |
| butyl stannoic acid | 3.10 |
| triphenylphosphite | 3.10 |

[1]Reaction product of neopentyl glycol, hexahydrophthalic anhydride, adipic acid, and 4,4'-methylenebis(cyclohexyl isocyanate) (available as DESMODUR W from Miles, Inc.) in a 1.00:0.50:0.22:0.002 mole ratio, having a hydroxyl value of 159.3 based on weight of resin solids, 90.0% in DOWANOL PM acetate.

The first two ingredients were charged to a suitable reactor equipped for vacuum distillation and heated to 140° C. under a $N_2$ blanket. Vacuum was applied to the system and DOWANOL PM acetate solvent was removed from the pot under reduced pressure. The reaction was cooled to 80° C. and the remaining ingredients were added to the reactor. The reaction mixture was heated to 100° C. and sparged with nitrogen for 20 minutes at this temperature. Upon completion of sparging the temperature of the reaction mixture was raised to 140° C. Vacuum was applied to the system until DOWANOL PM began to distill from the reaction mixture. The vacuum on the system was gradually increased as the reaction progressed to a maximum vacuum of 1 mm to maintain a steady distillation of DOWANOL PM. After the reaction was complete, the reaction product was thinned with 661 g DOWANOL PM acetate to a measured solids of 84.0% and a viscosity of Z5 on the Gardner-Holt scale. The thinned reaction product had a OH value of 18.5 based on resin solids, a number average molecular weight of 873, and a weight average molecular weight of 1292. The calculated carbamate equivalent weight was 479.

EXAMPLE E

A branched polyester was prepared from the following ingredients:

| Ingredient | Weight in grams |
| --- | --- |
| trimethylolpropane | 900.4 |
| methylhexahydrophthalic anhydride | 3326.4 |
| ESTERDIOL 204[1] | 4124.8 |
| TPP | 8.34 |
| BSA | 12.54 |

[1]2,2-dimethyl-3-hydroxypropyl 2,2-dimethyl-3-hydroxypropanoate, available from Union Carbide Chemicals and Plastics Co., Inc.

The above ingredients were charged to a suitable reactor, equipped with a $N_2$ sparge, a glycol recovery column and a distillation head, heated to 80° C., and degassed three times by pulling a vacuum on the reactor and backfilling with $N_2$. The reaction mixture was then heated to a temperature between 200° and 210° C. with removal of water. As water was removed from the reaction, the acid value dropped to 2.8. The final product was a transparent material with a viscosity >Z6 on the Gardner-Holt viscosity scale, a measured solids of 96.3%, a OH value of 125.4 based on resin solids, a number average molecular weight of 1254, and a weight average molecular weight of 2794.

EXAMPLE F

A carbamate functional branched polyester was prepared from the following ingredients:

| Ingredient | Weight in grams |
| --- | --- |
| polyester from Example E | 3050.4 |
| DOWANOL PM carbamate | 1034.03 |
| TPP | 4.07 |
| BSA | 4.07 |

A reactor equipped for vacuum distillation was charged with the above ingredients and heated to 95 C. The reaction mixture was degassed three times at this temperature by evacuating the reactor and backfilling with $N_2$ each time. Upon completion of degassing the temperature of the reaction mixture was raised to 140 C. Vacuum was applied to the system until DOWANOL PM began to distill from the reaction mixture. The vacuum on the system was gradually reduced as the reaction progressed to a maximum vacuum of 1 mm in order to maintain a steady distillation of DOWANOL PM. The resultant reaction mixture was a viscous, resinous material with a OH value of 8.8 and a measured solids of 98.7. After dilution with 1000 g n-propanol, the reaction mixture has a measured solids of 76.4%, a viscosity of $Z1^+$ on the Gardner-Holt scale. The carbamate functional branched polyester had a number average molecular weight of 1349, a weight average molecular weight of 3131, and a total N content of 2.51%. The calculated carbamate equivalent weight was 386.

EXAMPLE G

A carbamate functional acrylic polymer was prepared from the following ingredients:

| Ingredient | Weight in grams |
| --- | --- |
| acrylic polymer[1] | 2239.9 |
| DOWANOL PM carbamate | 903.9 |
| TPP | 3.11 |
| BSA | 3.11 |

[1]reaction product of hydroxypropyl acrylate, styrene, butyl acrylate, butyl methacrylate, methyl methacrylate, and methyl styrene dimer in a 40:20:19:18.5:0.5:2 weight ratio, approximately 10,000 weight average molecular weight, stripped to 100% theory solids A reactor equipped for vacuum distillation was charged with the above ingredients and heated to 100° C. The reaction mixture was sparged with $N_2$ for 20 minutes at this temperature. Upon completion of sparging the temperature of the reaction mixture was raised to 140° C. Vacuum was applied to the system until DOWANOL PM began to distill from the reaction mixture. The vacuum on the system was gradually reduced as the reaction progressed to a maximum vacuum of 1 mm in order to maintain a steady distillation of DOWANOL PM. After the reaction was complete, the reaction mixture was thinned with a 1:1 blend of butyl acetate and AROMATIC 100 (also called SOLVESSO 100, available from Exxon Chemical Co.) to a theory solids of 70% and a final viscosity of >Z6 on the Gardner-Holt scale. The carbamate functional acrylic polymer had a total N content of 2.93%, a number average molecular weight of 4063, and a weight average molecular weight of 18,884. The calculated carbamate equivalent weight was 386.

The following examples (1–7) show the preparation of various clear film-forming flexible compositions prepared with carbamate and/or hydroxyl functional materials and aminoplast curing agents. The coating compositions were evaluated in color-plus-clear applications.

Example 1

A clear film-forming composition was prepared by mixing together the following ingredients:

| Ingredient | Solid weight in grams | Solution weight in grams |
| --- | --- | --- |
| Propylene glycol methyl ether acetate | — | 4.8 |
| SOLVESSO 100 | — | 9.5 |
| oxo-hexyl acetate | — | 10.3 |
| n-propanol | — | 15.0 |
| xylene | — | 9.0 |
| TINUVIN 328[1] | 3.0 | 3.0 |
| AEROSIL R812 dispersion[2] | 5.5 | 12.5 |
| RESIMENE 741[3] | 35.0 | 39.7 |
| carbamate containing polyether of example B | 15.0 | 15.0 |
| carbamate containing acrylic polymer of example G | 10.5 | 16.6 |
| carbamate containing polyurethane of example D | 35.0 | 45.6 |
| DOW CORNING 200[4] | 0.004 | 0.74 |
| BYK 325[5] | 0.02 | 0.13 |
| Polybutylacrylate[6] | 0.25 | 0.42 |
| phenyl acid phosphate | 0.15 | 0.2 |
| Dodecylbenzene sulfonic acid | 0.75 | 1.10 |

[1]Substituted benzotriazole UV light absorber available from Ciba Geigy Corporation
[2]8 parts by weight (pbw) of a highly dispersed hydrophobic amorphous silicon dioxide available from Degussa Corporation; 50 pbw of a solution of hydroxyl functional acrylic polymer having a peak molecular weight of 8000, Mw of 9000, Mn of 3500 (determined by gel permeation chromatography using a polystyrene standard) made from 40% hydroxypropyl acrylate, 20% styrene, 19% butyl acrylate, 18.5% butyl methacrylate, 0.5% methyl methacrylate, 2% acrylic acid at 70% solids in isobutanol, xylene, and SOLVESSO 100; 48.75 pbw xylene; 1.5 pbw isobutanol; 6.75 pnw SOLVESSO 100.
[3]Partially methylated aminoplast resin available from Monsanto Chemical Company
[4]Solution of polymethylsiloxane, available from Dow Corning Corporation
[5]Solution of polyoxyalkylene-methylalkyl-polysiloxane copolymer available from Byk-Chemie.
[6]Flow control agent having a Mw of about 6700 and a Mn of about 2600, made in xylene at 60% solids

Example 2 (Control)

A clear film-forming composition was prepared by mixing together the following ingredients:

| Ingredient | Solid weight in grams | Solution weight in grams |
| --- | --- | --- |
| Propylene glycol methyl ether acetate | — | 4.8 |
| SOLVESSO 100 | — | 9.5 |

| Ingredient | Solid weight in grams | Solution weight in grams |
| --- | --- | --- |
| oxo-hexyl acetate | — | 10.3 |
| n-propanol | — | 15.0 |
| xylene | — | 9.0 |
| TINUVIN 328 | 3.0 | 3.0 |
| AEROSIL R812 dispersion | 5.5 | 12.5 |
| RESIMENE 741 | 35.0 | 39.7 |
| POLYMEG 1000 | 15.0 | 15.0 |
| Acrylic polymer[1] | 10.5 | 16.6 |
| Polyester-urethane polymer[2] | 35.0 | 45.6 |
| DOW CORNING 200 | 0.004 | 0.74 |
| BYK 325 | 0.02 | 0.13 |
| Polybutylacrylate of Example 1 | 0.25 | 0.42 |
| phenyl acid phosphat | 0.15 | 0.2 |
| Dodecylbenzene sulfonic acid | 0.75 | 1.10 |

[1] Acrylic polymer described in footnote 2 of Example 1.
[2] Linear polyester urethane described in footnote 1 of Example D

Example 3

A clear film-forming composition was prepared by mixing together the following ingredients:

| Ingredient | Solid weight in grams | Solution weight in grams |
| --- | --- | --- |
| Propylene glycol methyl ether acetate | — | 4.8 |
| SOLVESSO 100 | — | 9.5 |
| oxo-hexyl acetate | — | 10.3 |
| n-propanol | — | 15.0 |
| xylene | — | 9.0 |
| TINUVIN 328 | 3.0 | 3.0 |
| AEROSIL R812 dispersion | 5.5 | 12.5 |
| RESIMENE 741 | 20.0 | 22.7 |
| Anti-sagging agent[1] | 0.5 | 1.4 |
| carbamate containing polyether of example B | 15.0 | 15.0 |
| carbamate containing acrylic polymer of example G | 10.5 | 16.6 |
| carbamate containing polyester of example F | 49.5 | 64.5 |
| DOW CORNING 200 | 0.004 | 0.74 |
| BYK 325 | 0.02 | 0.13 |
| Dodecylbenzene sulfonic acid | 0.8 | 1.2 |

[1] Polymeric microparticle prepared in accordance with U.S. Pat. No. 4,147,688, Example 11.

Example 4 (Control)

A clear film-forming composition was prepared by mixing together the following ingredients:

| Ingredient | Solid weight in grams | Solution weight in grams |
| --- | --- | --- |
| Propylene glycol methyl ether acetate | — | 4.8 |
| SOLVESSO 100 | — | 9.5 |
| oxo-hexyl acetate | — | 10.3 |
| n-propanol | — | 15.0 |
| xylene | — | 9.0 |
| TINUVIN 328 | 3.0 | 3.0 |
| AEROSIL R812 dispersion | 5.5 | 12.5 |
| RESIMENE 741 | 20.0 | 22.7 |
| POLYMEG 1000 | 15.0 | 15.0 |
| Acrylic polymer | 10.5 | 15.0 |
| Polyester urethane polymer | 49.5 | 55.0 |
| DOW CORNING 200 | 0.004 | 0.74 |
| BYK 325 | 0.02 | 0.13 |
| Anti-sagging agent | 0.5 | 1.4 |
| Dodecylbenzene sulfonic acid | 0.8 | 1.2 |

Example 5

A clear film-forming composition was prepared by mixing together the following ingredients:

| Ingredient | Solid weight in grams | Solution weight in grams |
| --- | --- | --- |
| Propylene glycol methyl ether acetate | — | 4.8 |
| SOLVESSO 100 | — | 9.5 |
| oxo-hexyl acetate | — | 10.3 |
| n-propanol | — | 15.0 |
| xylene | — | 9.0 |
| TINUVIN 328 | 3.0 | 3.0 |
| AEROSIL R812 dispersion | 5.5 | 12.5 |
| RESIMENE 741 | 35.0 | 39.7 |
| carbamate containing polyether of example A | 15.0 | 15.0 |
| carbamate containing acrylic polymer of example G | 10.5 | 16.6 |
| carbamate containing polyurethane of example D | 35.0 | 45.6 |
| DOW CORNING 200 | 0.004 | 0.74 |
| BYK 325 | 0.02 | 0.13 |
| Polybutylacrylate of Example 1 | 0.25 | 0.42 |
| phenyl acid phosphat | 0.15 | 0.2 |
| Dodecylbenzene sulfonic acid | 0.75 | 1.10 |

Example 6

A clear film-forming composition was prepared by mixing together the following ingredients:

| Ingredient | Solid weight in grams | Solution weight in grams |
| --- | --- | --- |
| Propylene glycol methyl ether acetate | — | 4.8 |
| SOLVESSO 100 | — | 9.5 |
| oxo-hexyl acetate | — | 10.3 |
| n-propanol | — | 15.0 |
| xylene | — | 9.0 |
| TINUVIN 328 | 3.0 | 3.0 |
| AEROSIL R812 dispersion | 5.5 | 12.5 |
| RESIMENE 741 | 35.0 | 39.7 |
| carbamate containing polyether of example C | 15.0 | 15.0 |
| carbamate containing acrylic polymer of example G | 10.5 | 16.6 |
| carbamate containing | 35.0 | 45.6 |

-continued

| Ingredient | Solid weight in grams | Solution weight in grams |
|---|---|---|
| polyurethane of example D |  |  |
| DOW CORNING 200 | 0.004 | 0.74 |
| BYK 325 | 0.02 | 0.13 |
| Polybutylacrylate of Example 1 | 0.25 | 0.42 |
| phenyl acid phosphat | 0.15 | 0.2 |
| Dodecylbenzene sulfonic acid | 0.75 | 1.10 |

Example 7 (Control)

A clear film-forming composition was prepared by mixing together the following ingredients:

| Ingredient | Solid weight in grams | Solution weight in grams |
|---|---|---|
| n-propanol | — | 15.1 |
| xylene | — | 19.5 |
| TINUVIN 328 | 3.0 | 3.0 |
| AEROSIL R812 dispersion | 5.5 | 12.5 |
| Polyester-urethane[1] | 41.0 | 46.0 |
| RESIMENE 741 | 25.0 | 28.2 |
| MR225[2] | 10.0 | 15.4 |
| Acrylic polymer | 9.5 | 26.4 |
| POLYMEG 1000 | 10.0 | 10.0 |

-continued

| Ingredient | Solid weight in grams | Solution weight in grams |
|---|---|---|
| DOW CORNING 200 | 0.004 | 0.74 |
| BYK 325 | 0.02 | 0.13 |
| TINUVIN 292[3] | 0.88 | 0.88 |
| Polybutylacrylate of Example 1 | 0.25 | 0.42 |
| phenyl acid phosphat | 0.15 | 0.2 |
| Dodecylbenzene sulfonic acid | 0.75 | 1.10 |

[1]Reaction product of 1,6-hexane diol, hexahydrophthalic anhydride, neopentyl glycol, and Desmodur W (an aliphatic diisocyanate available from Miles, Inc.) in a 1:1.2:1:0.73 mole ratio, having a hydroxyl value of 183 based on weight of resin solids, 90% in DOWANOL PM acetate.
[2]Partially butylated polymeric melamine resin available from Monsanto Co.
[3]Sterically hindered tertiary amine light stabilizer available from Ciba Geigy Corporation Thermoplastic polyolefin test substrates available from Himont Advanced Materials as ETA-3183 were prepared for coating and acid etch testing by first spray applying a solventborne adhesion promoter available from PPG Industries, Inc., as MPP4110 to the substrate at a thickness of 0.25 mils at ambient atmospheric conditions. The resulting film was dried at ambient atmospheric conditions for two minutes. The promoter was then immediately coated with 1.0 mils of a solventborne elastomeric pigmented base coat composition, commercially available from PPG Industries, Inc. and identified as CBC-7517C. The clear film-forming compositions of examples 1 to 7 were then applied separately wet-on-wet at a thickness of 1.6 mils to seven base coated substrates.

The resultant composite coatings were cured at 250° F. (121.1° C.) for 30 minutes to cure both the base coat and clear coat. The panels were baked in a horizontal position. The properties of the composite coatings are reported in Table I below.

TABLE I

| Example | % OH functional resin based on weight of resin solids[1] | Hydroxyl number of composition based on weight of resin solids | Acid etch rating[2] | Acid etch rating[3] | Cold Flex[4] |
|---|---|---|---|---|---|
| 1 | 4.5 | 8 | 2 | 3 | 10 |
| 2 (Control) | 65 | 96 | 8 | 9 | 10 |
| 3 | 4.5 | 8 | 2 | 2 | 8 |
| 4 (Control) | 79.5 | 118 | 8 | 9 | 10 |
| 5 | 4.5 | 8 | 3 | 3 | 9+ |
| 6 | 4.5 | 8 | 2 | 3 | 10 |
| 7 (Control) | 69.5 | 111 | 9 | 9 | 10 |

[1]Note that all the compositions had at least 4.5% OH functionality by weight, due to the acrylic polymer (see footnote 2 of Example 1) added to the formulation.
[2]After 30 minutes at 100° F. (37.7° C.)
[3]After 30 minutes at 180° F. (82.2° C.)
[2,3]Test panels were made in triplicate and spotted four times with 0.2 ml of a sulfurous acid solution (350 grams deionized water and 12 grams sulfurous acid to give a pH of 2.0 plus or minus 0.1) using a 23 gauge syringe. The panels, with drops uncovered, were then placed in electric ovens at 110° F. (43.3° C.) and at 180° F. (82.2° C.) for thirty minutes. The panels were removed from the ovens and were washed with soap and water and dried, then rated for degree of acid each resistance on a scale of 1–10 (1 = no observable etching; 10 = severe etching).
[4]Brittleness of the color-plus-clear composite coating over primed RIM (Reaction Injection Molding) substrate was tested using General Motors specification 9503P. The coated plastic substrate was cooled to 0° F. (−17.8° C.) and bent around a half-inch mandrel. A value below 8 on a scale of 1 to 10 is considered unacceptable (poor flex). A value of 10 indicates no cracking of the composite coating.

We claim:

1. A method for applying a composite coating to a plastic substrate which is a flexible thermosetting or thermoplastic material which comprises applying to the substrate a colored film-forming composition to form a base coat and applying to said base coat a clear film-forming composition to form a transparent top coat over the base coat wherein the clear film-forming composition comprises a flexible, curable film-forming composition, comprising:

(i) 10 to 50 percent by weight based on the weight of resin solids of a polyether polymer containing a plurality of terminal or pendant carbamate groups of the structure:

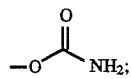

incorporated into the polyether polymer, wherein said polyether polymer has on average at least two of said terminal or pendant carbamate groups per molecule;

(ii) 5 to 50 percent by weight based on weight of resin solids of a polymer selected from the group consisting of a polyester polymer, a polyurethane polymer, an acrylic polymer, and mixtures thereof wherein each polymer contains a plurality of terminal or pendant carbamate groups of the structure:

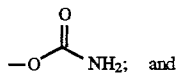 and (iii) 20 to 50 percent based on weight of resin solids of an aminoplast crosslinking agent containing methylol and/or methylol ether groups, wherein the equivalent ratio of said pendant or terminal carbamate groups to methylol or methylol ether groups is from 0.5 to 2:1 and is sufficient to form a crosslinked film.

2. The method of claim 1 wherein said polyether polymer has an equivalent weight of from about 140 to 2500 based on equivalents of said terminal or pendant carbamate groups.

3. The method of claim 1 wherein said aminoplast is a condensate of melamine with formaldehyde and optionally an alcohol containing from 1 to 4 carbon atoms.

4. The method of claim 1 wherein the substrate is selected from the group consisting of polyethylene, polypropylene, thermoplastic urethane, polycarbonate, thermosetting sheet molding compound, reaction-injection molding compound, acrylonitrile-based materials, and nylon.

5. The method of claim 1 wherein each polymer has an equivalent weight of from about 140 to 2500 based on equivalents of said terminal or pendant carbamate groups.

6. The method of claim 1 wherein the polyester polymer is present in the film-forming composition in amounts up to 60 percent by weight based on weight of resin solids in the film-forming composition.

7. The method of claim 1 wherein the polyurethane polymer is present in the film-forming composition in amounts up to 50 percent by weight based on weight of resin solids in the film-forming composition.

8. The method of claim 1 wherein the acrylic polymer is present in the film-forming composition in amounts up to 50 percent by weight based on weight of resin solids in the film-forming composition.

9. The method of claim 1 wherein said polyether polymer is selected from the group consisting of polyalkylene ether polyols and polyether polyols formed from oxyalkylation of various polyols.

10. The method of claim 1 wherein said polyether polymer is selected from the group consisting of polyalkylene ether polyols having the following structural formula:

and

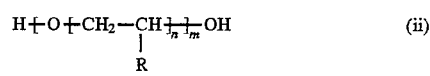

where the substituent R is hydrogen or lower alkyl containing from 1 to 5 carbon atoms including mixed substituents, and n is typically from 2 to 6 and m is from 8 to 100 or higher.

11. The method of claim 1 wherein said polyether polymer has a number average molecular weight of from about 500 to 5000.

12. The method of claim 1 wherein the polyester polymer has a number average molecular weight of from about 600 to 2000, and the polyurethane polymer has a number average molecular weight of from about 300 to 3000, and the acrylic polymer has a number average molecular weight of from about 900 to 13,000.

13. The method of claim 5 wherein the polyether polymer has a number average molecular weight of from about 1100 to 3200 and is present in the clear film-forming composition in amounts of 10 to 50 percent by weight;

the polyester polymer has a number average molecular weight of from about 800 to 1500 and is present in amounts of 20 to 50 percent by weight; and the polyurethane is present in amounts up to 20 percent by weight and has a number average molecular weight of from about 300 to 600; and the acrylic polymer is present in an amount from 5 to 15 percent by weight and has a number average molecular weight of from about 1000 to 5000 where all the percents by weight are based on the weight of resin solids in the clear film-forming composition.

14. The method of claim 11 wherein the clear film-forming composition prior to crosslinking and excluding the hydroxyl functionality associated with the aminoplast has a theoretical hydroxyl value of less than 50.

15. The method of claim 1 wherein the clear film-forming composition is capable of urethane crosslinking between the terminal and pendant carbamate groups of the (i) and (ii) polymers and the aminoplast.

* * * * *